United States Patent [19]
Lim et al.

[11] Patent Number: 5,938,732
[45] Date of Patent: Aug. 17, 1999

[54] LOAD BALANCING AND FAILOVER OF NETWORK SERVICES

[75] Inventors: Swee Boon Lim, Cupertino, Calif.; Ashish Singhai, Urbana, Ill.; Sanjay R. Radia, Fremont, Calif.

[73] Assignee: Sun Microsystems, Inc., Palo Alto, Calif.

[21] Appl. No.: 08/763,289

[22] Filed: Dec. 9, 1996

[51] Int. Cl.$^6$ ............................ G06F 13/38; G06F 15/17
[52] U.S. Cl. ......................... 709/229; 709/226; 709/239
[58] Field of Search ................. 395/200.59, 200.33, 395/200.49, 182.03, 182.09, 72, 200.54, 200.69, 200.56; 709/224, 239, 226, 229

[56] References Cited

U.S. PATENT DOCUMENTS

| | | | |
|---|---|---|---|
| 5,005,122 | 4/1991 | Griffin et al. | 395/200.33 |
| 5,089,958 | 2/1992 | Horton et al. | 395/182.03 |
| 5,367,698 | 11/1994 | Webber et al. | 395/200.33 |
| 5,379,418 | 1/1995 | Shimazaki et al. | 395/182.09 |
| 5,448,718 | 9/1995 | Cohn et al. | 711/4 |
| 5,771,354 | 6/1998 | Crawford | 395/200.59 |
| 5,774,660 | 6/1998 | Brendel et al. | 395/200.31 |

FOREIGN PATENT DOCUMENTS

| | | |
|---|---|---|
| 0384339 A2 | 2/1990 | European Pat. Off. . |
| 0 817 020 A2 | 1/1998 | European Pat. Off. . |

OTHER PUBLICATIONS

Ji Hua Xie Li, "A Distributed Computing Model Based on Multiserver," Operating Systems Review (SIGOPS), vol. 30, No. Oct. 4, 1996, pp. 3–11, XP000639695.

Richard M. Adler, "Distributed Coordination Models for Client/Server Computing," Computer, vol. 28, No. 4, Apr. 1, 1995, pp. 14–22, XP000507856.

(author unknown) "Local Area Network Server Replacement Procedure," IBM Technical Disclosure Bulletin, vol. 38, No. 1, Jan. 1, 1995, pp. 235 and 236, XP000498750.

*Primary Examiner*—Mark H. Rinehart
*Attorney, Agent, or Firm*—Graham & Jones LLP

[57] ABSTRACT

A system and method for many-to-many failover and load balancing establishes a plurality of service groups for providing desired computing services. Each service group comprises a plurality of hosts, and each host within the service group is available to perform the computing services for which that group as a whole is responsible. Each host may belong to a plurality of service groups. Each operational host within a service group transmits periodic messages to each other host within the service group advising of the status of the transmitting host. A leader host evaluates the periodic messages and, where appropriate, dynamicall reassigns responsibility for particular computing services to a host within the group. The reassignment can be due either to failover or load balancing.

16 Claims, 14 Drawing Sheets

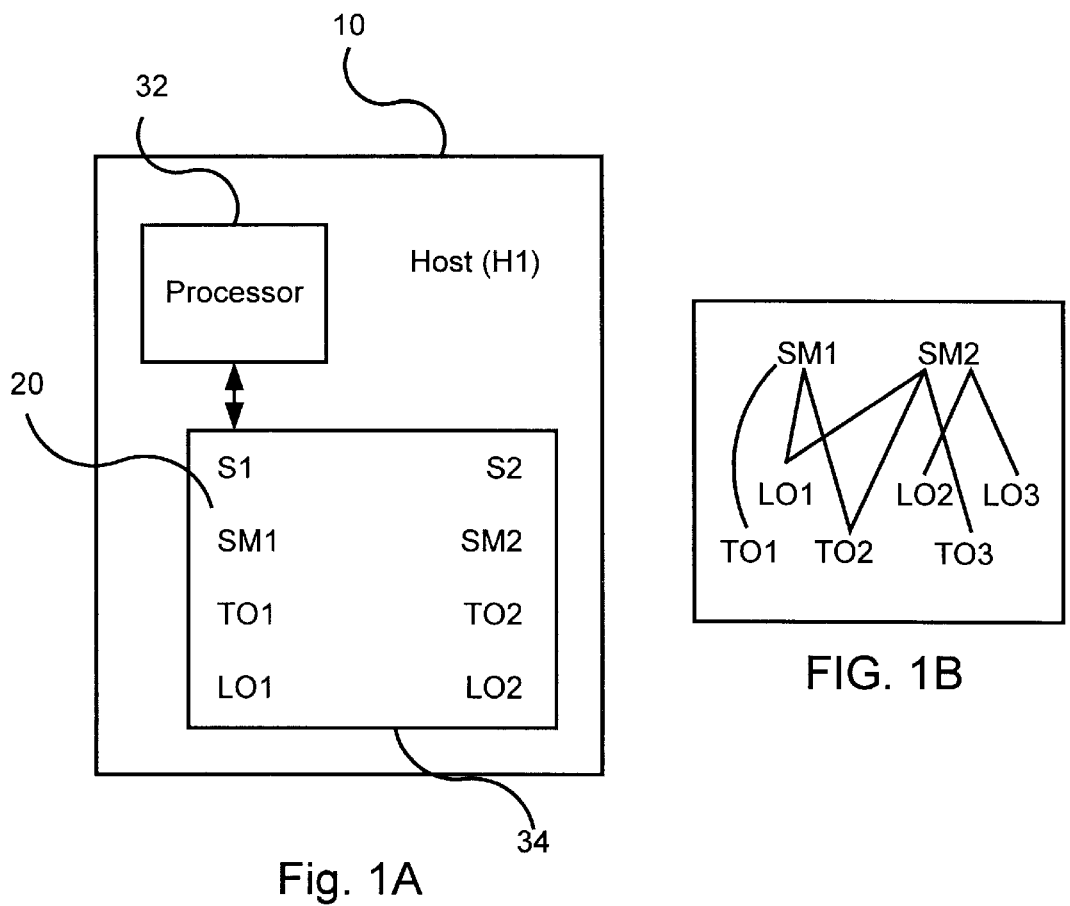
Fig. 1A
FIG. 1B
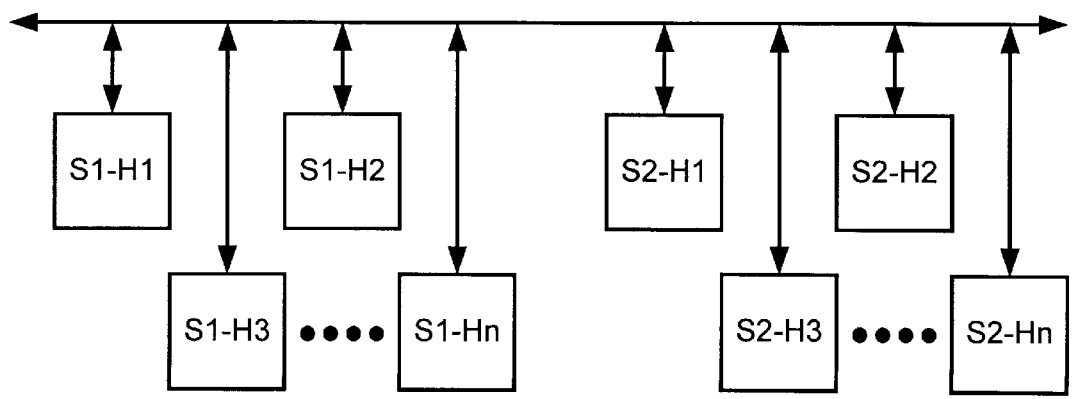
FIG. 2A

| | |
|---|---|
| MESSAGE SEQ NUMBER | GLOBALLY UNIQUE ASCENDING NUMBER |
| MESSAGE TYPE = INFORMATION | |
| MY HOST INFORMATION | HOST INFORMATION ENTRY (A) |
| OTHER HOST INFORMATION | HOST INFORMATION D B (C) (i.e. SET OF HOST INFORMATION ENTRIES) |
| SERVICE ADDRESS db | REF OB (SERVICE ADDRESS LAST RECEIVED) |

FIG. 2B

| | |
|---|---|
| ID ADDRESS | (IP ADDRESS) |
| CONTROL ADDRESSES | (SET OF IP ADDRESSES) |
| OK | (FLAG) BINARY |
| QUIESCE | (FLAG) BINARY |
| LOAD | (UNSIGNED 32-BIT) |
| CAPACITY | (UNSIGNED 32-BIT) |
| SERVICE ADDRESSES | (SET OF SERVICE ADDRESS INFORMATION) (INDEX BY SERVICE ADDRESS) |

FIG. 2C

| | |
|---|---|
| SERVICE ADDRESS | (IP ADDRESS) |
| STATE | ENUM OF RELEASING, ACQUIRING, ONLINE |

FIG. 2D

| SET OF STATES | (BIT MASK ONE EACH FOR ACQUIRING, RELEASING, ONLINE) |
|---|---|
| PREFERRED-ID-ADDRESS | (IP ADDRESS) ADDRESS OF THE HOST THAT THIS SERVICE ADDRESS IS THE PREFERRED SERVICE ADDRESS |
| SERVED-BY-PREFERRED | INDICATES IF SERVICE ADDRESS IS SERVED BY PREFERRED HOST / ID ADDRESS (BOOLEAN) |
| ID-ADDRESSES | SET OF ID ADDRESSES THAT CLAIMS TO SERVE THIS SERVICE ADDRESS (i.e. ACQUIRING, RELEASING, ONLINE STATES) |

FIG. 6B

| SERVICE ADDRESS | IP ADDRESS |
|---|---|
| UTIL | UTILIZATION |
| WEIGHED UTIL | WEIGHTED UTILIZATION |

FIG. 6C

LOAD BALANCING AND FAILOVER OF NETWORK SERVICES

The following co-pending patent applications, which were filed on Dec. 9, 1996, are related to the subject application and are herein incorporated by reference:

1) U.S. application Ser. No. 08/763,234, entitled "Method and Apparatus for Client-Sensitive Name Resolution Using DNS" of Swee Boon Lim, Sanjay R. Radia, and Thomas Wong.
2) U.S. application Ser. No. 08/762,393, entitled "Method and Apparatus for Access Control in a Distributed Multiserver Network Environment" of Thomas Wong, Sanjay R. Radia, Swee Boon Lim, Panagiotis Tsirigotis, and Rob Goedman.
3) U.S. application Ser. No. 08/762,402, entitled "Method and Apparatus for Dynamic Packet Filter Assignments" of Sanjay R. Radia, Swee Boon Lim, Panagiotis Tsirigotis, Thomas Wong, Rob Goedman, and Mike Patrick.
4) U.S. application Ser. No. 08/763,068, entitled "Secure DHCP Server" of Swee Boon Lim, Sanjay R. Radia, Thomas Wong, Panagiotis Tsirigotis, and Rob Goedman.
5) U.S. application Ser. No. 08/762,212, entitled "A Method to Activate Unregistered Systems in a Distributed Multiserver Network Environments of Thomas Wong and Sanjay R. Radia.
6) U.S. application Ser. No. 08/762,709, entitled "A Method and Apparatus for Assignment of IP Addresses" of Thomas Wong, Swee Boon Lim, Sanjay R. Radia, Panagiotis Tsirigotis, Rob Goedman, and Mike Patrick.
7) U.S. Application Ser. No. 08/762,933, entitled "A Method for Using DHCP to Override Learned IP Addresses in a Network" of Sanjay R. Radia, Thomas Wong, Swee Boon Lim, Panagiotis Tsirigotis, Rob Goedman, and Mike Patrick.
8) U.S. application Ser. No. 08/762,705, entitled "Dynamic Cache Preloading Across Loosely Coupled Administrative Domains" of Panagiotis Tsirigotis and Sanjay R. Radia.
9) U.S. application Ser. No. 08/673,951, entitled "A Service for a Redundant Array of Internet Servers" of Swee Boon Lim, filed Jul. 1, 1996, The following co-pending patent application is related to the subject application and is herein incorporated by reference.

A) U.S. application Ser. No. 08/673,951, filed Jul. 1, 1996, entitled "A Name Service for a Redundant Array of Internet Servers" of Swee Boon Lim.

FIELD OF THE INVENTION

This application relates to systems and methods for management of services within a network of computer systems, and particularly relates to load balancing and host failover within such a network.

BACKGROUND OF THE INVENTION.

In providing reliable computer services, and especially for Internet applications such as HTTP, FTP, News and email, a fundamental requirement is a platform for providing those services which is both scaleable and reliable.

There are two kinds of scaleability: vertical and horizontal. Vertical scaleability is best characterized by the IBM paradigm of the 1970's and 1980's, in which a company's growing need for computer services meant that a less powerful computer was replaced in its entirety by a more powerful computer. This paradigm has been substantially discredited for a number of reasons, including the fact that it is limited to whatever is the most powerful hardware available and because of the expense of such a single machine becomes prohibitive. Such machines are inherently not optimal in price/performance. The lack of reliability of a single machine is also a key limitation in vertical scaleability.

Horizontal scaleability, in contrast, adds more computer systems as load increases. Each of these computers is typically less powerful than the vertically IS scaleable solution, but the combined power of multiple such systems frequently exceeds that of the vertical solution for many applications. The horizontal solution also permits the user to maximize the cost benefit of prior investments (i.e., prior purchases of still-compatible computer systems). Horizontal scaleability can therefore be seen to offer a number of-key advantages over vertical scaleability.

Reliability is also best served by a horizontally scaleable solution. Reliability is measured by the availability of computer services when needed; since no single computer has ever proved to have 100% up-time, reliability requires more than one computer capable of providing the needed computer services.

As the need for continuously available computer services has grown, the need for increased scaleability and reliability has also grown. One of the key issues has been to ensure that a service provided by a first computer, normally termed a host, can be provided by another computer, or a backup, in the event the host becomes unavailable. This transfer of services is termed failover, and in current systems is typically handled by software.

Two failover schemes are well-known in the prior art. One-to-one failover designates a host system as primary and a backup system as secondary; in the most classic implementation of this approach, the secondary system is idle—that is,-it provides no services—until the host fails. When the host becomes unavailable, the secondary system provides the services normally provided by the host. Symmetric one-to-one failover is a similar technique, wherein each of the "host" and "backup" systems provide distinct but useful sets of services when both are available, and each is capable of providing the services normally provided by the other. Thus, each system is both a primary and a secondary, but only the one machine can serve as a backup to the other.

The second failover scheme known in the prior art is many-to-one failover. In this approach there are many primary systems but only a single secondary, with each of the primaries providing a distinct set of services. The secondary or backup system is capable of performing any of the services provided by any or all of the primaries, but normally sits idle until a primary fails.

Each of these schemes is limited in that the networks are reliable only as long as only one system fails; network services become unavailable if more that one system becomes unavailable. In addition, these systems do not allow for good failover scaleability because the secondary system typically must be identified at initial configuration and cannot thereafter be changed. Along this same line, prior art systems do not allow failed hosts to be permanently deinstalled, nor do they allow new hosts to be added and configured without reconfiguring existing hosts. An additional limitation of such prior art techniques is the inability to perform load balancing.

There has therefore been a need for an improved failover system in which computing services continue to be available over the network even when more than one host or primary system has failed, and in which hosts may be added or removed without reconfiguring the remainder of the systems forming the network.

SUMMARY OF THE INVENTION

The present invention overcomes virtually all of the limitations of the prior art by providing a system and method by which computing services may be provided by any of a plurality of systems within a group, such that the computing services provided by that group will continue to be available as long as at least one system is available within the group. The system and method involves assignment of IP addresses to the hosts and services and management of those IP addresses to achieve the functionality described below.

To provide many-to-many failover, a plurality of hosts are organized into a "service group" wherein each host is capable of providing the service rendered by the service group. Each host may also be available to provide other services, and thus may be members of other service groups. At any given time, a service is provided by all of the active members of the service group. Thus, it is important to maintain communications within the group and to coordinate the cooperation of the various hosts to ensure that the service provided by that group remains available, even if one or more hosts providing the service become unavailable from time to time, such as through failure or load balancing.

To maintain communications among the hosts within the service group, each host periodically sends a "control message" to all other hosts within the group. The control message may also be thought of as an "info message" or, for some purposes, a "heartbeat". The control message basically keeps each other host appraised of the status of the sending host as well as data about the perceived status of the other hosts within the group.

To coordinate the cooperation of the various hosts within the service group a "leader" host is established and assigns to the various hosts responsibility for particular service addresses. The leader identifies resources, such as service addresses (which may, for example, be IP addresses) which are not being attended and causes such resources to be acquired by designated hosts. The leader also dynamically reassigns resources to hosts which have been newly added or restored to the service group, as well as causing the release of resources handled by failed hosts.

Load balancing can also be accomplished with the present invention, either through statistical load-balancing by measuring utilization and using round-robin rotation of entries in a Domain Name Service (DNS) zone, or through DNS zone modification.

Utilization may be determined as a ratio of load (expressed, for example, in instructions per second not idling) divided by current capacity (typically expressed in terms of instructions per second) and for each host is calculated by a service specific module, since each service supported by a host may have different load and capacity. By comparing the utilization with a preset maximum utilization setting (which may be referred to as a "high water" mark), load shedding can be initiated if a host's utilization exceeds that high water mark by shifting new connections to other less-loaded hosts. When a host's utilization drops below a preset minimum utilization (or "low water" mark), that host can be added back to the DNS zone.

DNS zone modification can be used for load balancing by establishing a configuration parameter that specifies the minimum number of available service—addresses that must be present in a DNS zone. By such an approach, highly loaded hosts that exceed the high water mark may continue to be identified as available.

Other features of the system of the present invention include provisions for maintaining hosts as hot spares; preventing a host from acquiring service addresses—i.e., maintaining a host in a "quiesced" state; and failure detection for either a total host failure or a service failure.

In the foregoing manner the management of service addresses in accordance with the present invention can be seen to provide computing services in a new and novel manner. This and additional advantages will be better understood from the followed Detailed Description of the Invention which, taken together with the appended Figures, illustrate an exemplary embodiment of the invention and serve to explain the principles of the invention.

THE FIGURES

FIG. 1A shows in block diagram form the operation of a RAIS daemon within a host handling various object types in accordance with the present invention.

FIG. 1B shows the linking of various service monitors to their associated test objects and load objects.

FIG. 2A shows in block diagram form a network comprising a plurality of service groups.

FIG. 2B shows the data structure of a Control Info Message.

FIG. 2C shows the data structure of the Host Information Entry.

FIG. 2D shows the data structure of the Service Address Database.

FIG. 6B shows the data structure of the control service address table.

FIG. 6C shows the data structure of a table showing utilization and weighted utilization.

DETAILED DESCRIPTION OF THE INVENTION

Figure 3:
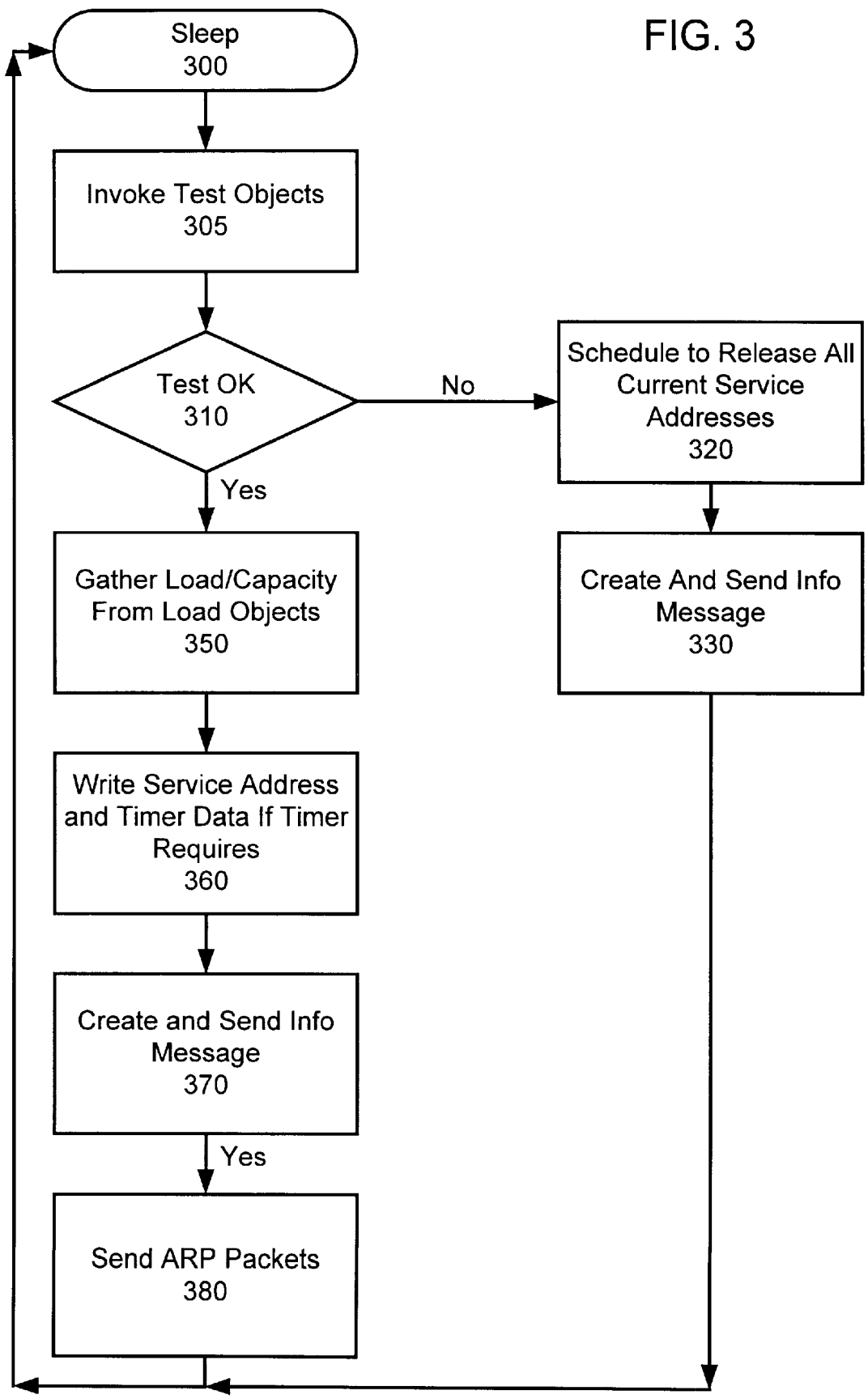
FIG. 3 shows in flow diagram form the "transmit" thread of the service monitor.

The present invention provides a system and method by which a computing service may be provided by any of a plurality of systems within a group, such that the computing service provided by that group will continue to be available as long as at least one system is available within the group. The invention is particularly well-suited to operate on a Redundant Array of Independent Servers, or RAIS.

In addition, the present invention permits new hosts to be added and configured without reconfiguring existing hosts. The system of the present invention then dynamically and automatically incorporates the new hosts into the appropriate group. Similarly, failed hosts may be removed without reconfiguring the remaining hosts.

The foregoing improvements are achieved through appropriate management of the IP addresses of a plurality of computer systems, each of which may be thought of as a service provider for a computing service available from the network. Each computer system, or host, is assigned a unique IP address in the conventional manner, but the IP addresses are then grouped according to providers of a desired service, such that each member of the group is available to provide that service. This collection of hosts may be referred to as a "service group," and the members of a service group cooperate to provide a particular service. A host may belong to multiple service groups, but for purposes of clarity and simplicity the following discussion will be limited to describing the interaction among hosts in a single service group.

To maintain coordination among the various members of the service group, a "service group address" is established, which is simply an IP address for that group. All members of the service group communicate with each other using the service group address—that is, each member transmits messages to all other group members by addressing the message to the service group address, and each member receives messages from all other service group members by receiving messages destined to the service group address. These messages, which may be thought of as "control messages," communicate the well-being of the host providing the message, the status of each service address, actions to be performed by the members of the service group, and any other function suited to the messaging capability.

For increased reliability, multiply redundant hardware network interfaces may be provided for use by the hosts. These interfaces, which may be referred to hereinafter as "control interfaces," provide the means by which the host may send and receive control messages. Certain network interfaces may be referred to as "service network interfaces," which permit clients to communicate with the service on the host. Thus, service network interfaces are simply network interfaces used by clients to access the service on the host. A network interface may be both a service interface and a control interface; however, in a presently preferred arrangement each host will typically have at least two control interfaces, each connected to an independent and isolated network.

A "control address," as used herein, refers to the IP address of a control interface. Each host will preferably have one or more control addresses, and typically must have at least one control interface. The first control address is typically used to identify uniquely the associated host, and may also be referred to as the "host id" or "id_address" hereinafter. Control addresses identify which interface the host should use to transmit and receive group messages.

A service address is an IP address that hosts in the service group provide service through. Management of such service addresses is a key portion of the present invention.

When a new host becomes available to a service group, it introduces into the service group both a host id and a service address. The service address is associated with, or belongs to, this host unless the host fails, and is known as the "preferred service address" for that host.

As noted previously, each host within a service group periodically sends control (or info) messages to the service group via the service group address. Each info message includes, among other things, a set of the host's control addresses, its preferred service address and a set of service addresses it is currently serving. These messages enable members of the service group to determine the status of each host in the service group.

Another function of the control messages is to permit the hosts within a service group to elect one of the hosts to fill the logical role of "leader" of the service group. Because the role of leader is logical, the role may move from one host to another at various times, including when hosts are added or removed. In an exemplary embodiment, the host with the lowest host id is denominated the leader, although other methods are also acceptable.

The leader of a service group manages service addresses within the group. Among other tasks, the leader tries to establish various conditions at equilibrium, including that all, service addresses are being served, that each service address is assigned to only one host, and that each host will serve its preferred service address. The leader also initiates corrective action if the conditions are violated, typically by causing a host either to serve or stop serving a service address; this may be thought of as "acquiring" or "releasing." By such acquiring and releasing of service addresses, the hosts included within a service group ensure that all addresses are being served. In addition, the present invention includes the ability to modify domain name service bindings by modifying zone files and notifying the DNS server of zone file changes, as described in the concurrently filed U.S. Patent Application identified as number (1) in the Related Applications portion, above. Domain Name Zones are also discussed at length on the Internet RFC pages 1034 and 1035. Basically, a zone is a group of IP addresses with a single common parent, although a zone may not include all of the child addresses or any lower level nodes.

The leader is also solely responsible for assigning service addresses; thus, while a host added to the system presents with a preferred service address, it does not own that service address until the leader assigns it. The leader listens to control messages and quickly releases the preferred service address introduced by the joining host if currently being served by another host in the service group. If the preferred service address is not being served by anyone, the leader simply assigns it to the new host.

The case where a different host has already been assigned the preferred service address of the new host usually arises where a host has previously failed, and is now rejoining the group. In such a situation, the leader will typically request the host currently owning the preferred service address to release it, and will then wait for the release request to complete before assigning the preferred service address to the joining host.

When a host fails, the leader will detect that the service addresses that were originally served by the failed host are not being actively served, because the control messages will show increasingly long periods since the last time the service addresses were served. The leader then reassigns these unserved addresses to other available hosts within the group. The reassignments may be made randomly, or may be made base on a load-balancing scheme, or through any other suitable method.

The reassignment of service addresses permits failed hosts to be removed from the service group. A service address that is not assigned to its preferred host is referred to as an "orphaned" service address. Associated with each orphaned service address is a logical countdown timer maintained by the leader. This countdown timer is created and started when the address becomes orphaned; when it expires, the service address is invalidated. When the service address goes invalid, the leader notices that a host is serving an unknown service address and requests that host to release it.

Because the integrated name service (discussed below) does not advertise orphaned service addresses, such orphaned addresses cannot acquire new clients through the name service. As the clients of the orphaned address logout or disconnect over time, the need from the orphaned service address is eventually eliminated and the address can be invalidated or eliminated. If it is preferred not to cause such automatic removal of such addresses, the countdown timer can be set for very high values, perhaps in the range of years.

The integrated name service mentioned above refers to the ability of the present invention to modify DNS bindings by modifying zone files and notifying the DNS server of the zone file changes. See the applications described in the Related Applications portion, above; in particular, see U.S. Pat. application Ser. No. 08/673,951, entitled "A Service For a Redundant Array of Internet Servers" of Swee Boon Lim, filed Jul. 1, 1996.

To ensure that a host hosting a DNS server learns about the members of a service group, it must also belong to that service group. If it is also providing the service of that group, it will receive messages in the normal fashion. If not, it may join the group but simply identify itself as failed. In this manner it will receive appropriate messages, but will not be assigned any service addresses by the leader. In a preferred embodiment of the invention, each service group has its own DNS zone. This requirement isolates the DNS changes originating from a service group to a single DNS zone file. In addition, the DNS zone is set up such that on preferred service addresses of available members are advertised. Since orphaned service addresses cannot be obtained, orphaned service addresses will fade away as described above.

Load balancing is another important aspect of the present invention. Two techniques may be used in combination: either statistical load-balancing, or zone modification. To use zone modification load balancing, the info message includes two values: one is the current load; the other is current capacity. Current capacity is typically expressed in instructions per second; current load is typically expressed in number of instructions per second not idle, measured over a suitable duration. For a network bandwidth intensive service, capacity could be the maximum bandwidth of the service interfaces, while load may be the average bandwidth consumed during the last measurement interval.

Utilization is simply determined by dividing the load by the capacity. An operator-configured high water mark can be established, and if a given host exceeds the high water mark for utilization, that host can be removed from the DNS zone in most circumstances. This shifts new connections to other hosts with less utilization. When the host's utilization drops below an operator-configured low water mark, the host is added back to the DNS zone and again becomes available for assignment of new addresses.

A configuration parameter may also be provided which specifies the minimum number of available service addresses that must be present in the DNS zone, to prevent removal of all preferred service addresses from the zone. To prevent the number of available addresses from falling below this minimum, highly utilized hosts may be advertised.

By proper management of the service addresses, various network functions can be managed, hot sparing, quiescing and failure detection. Hot sparing involves hosts designated as service providers only if another host fails; in essence, such devices are surrogates for failed hosts and their preferred service addresses. A hot spare host does not have a preferred service address, but instead sends info messages advising that it is available. This allows the leader to assign service addresses to the hot spare in the event it is needed. In particular, the leader will typically assign orphaned service addresses to hot spares only. Assignment of service addresses may either be random or in accordance with a load-balancing scheme.

Quiescing is defined as preventing a host in a service group from acquiring service addresses, while at the same time permitting that host to release addresses; in an exemplary embodiment, setting a host as quiesced requires intervention by the system operator. This enables system administrators to address resource problems without declaring the affected host as failed. Like failed hosts, quiesced hosts are not included in the service group's DNS zone, and thus their address does not show up in the list of available hosts; unlike failed hosts a quiesced host can continue to serve its current service addresses.

Failure detection, also available to be performed by the present invention, involves monitoring of the "info" or control messages sent by each host. The info messages basically serve as a "heartbeat" signal. A total host failure is detected if no heartbeat signal occurs within a timeout interval. The frequency of transmission of the info message/heartbeat and the timeout interval may be adjusted by the operator to optimize system operation. Additionally, a host may experience service failures, which occur when a host can no longer provide a service due to partial failure. These failures may be transient or persistent, and may involve software or hardware failures such as resource exhaustion or corrupted data, among others. In an exemplary embodiment, hosts with service failures may continue to participate in a service group, although such hosts will voluntarily release their service addresses.

Referring first to FIG. 1A, a computer system, or host, 10 has resident therein a daemon 20 handling network services 30A and 30B such as HTTP or NEWS. Each of such services 30 comprises a plurality of object types, including a service monitor SM1 or SM2, a test object TO1 and TO2 (respectively) and a load object LO1 and LO2 (respectively.) As will be appreciated in greater detail hereinafter, the Service Monitor includes many of the key program elements in the present invention, and essentially manages many of the remaining operations. The test object serves simply to verify that the particular host is working correctly and makes this information available for use by the service monitor. Likewise, the load object simply measures capacity and load so that this data can be used by the service monitor. The combination of object types cooperate to provide the network service; the service monitors, test objects and load objects are implemented by processors 32 executing in memory 34. The computer system 10 is of the type described in co-pending U.S. Patent application Ser. No. 08/763,234 (entitled "Method and Apparatus for Client-sensitive Name Resolution Using DNS," naming as inventors Swee Boon Lim, Sanjay R. Radia and Thomas Wong, filed on even date herewith and commonly assigned with the present application), which is incorporated herein by reference. Although only two such services are shown in FIG. 1A, it will be understood by those skilled in the art that any number of services may be provided by a particular host 10.

Referring next to FIG. 1B, the relationships between the service monitors SM1 and SM2 and the associated test objects TO1–TO2 and load objects LO1 and LO2 are illustrated in the context of the RAIS daemon 20. In particular, as an exemplary arrangement only, it can be seen that service monitor SM1 is linked to test objects TO1 and TO2 and load object LO1, while service monitor SM2 is linked to test object TO3 and load object LO2. A service monitor may be linked to any number of test objects and load objects, and each test object and load object may be linked to more than one service monitor.

In accordance with the present invention, each provider of a service 30 is identified by a unique IP address. Next referring to FIG. 2A, and in accordance with a key feature of the present invention, each network service 30 may be provided by a plurality of hosts 10 of the type shown in FIGS. 1A–1B. This plurality of hosts is configured in what is referred to herein as a service group 100, and multiple service groups 100 may be interconnected within a network 110 to provide all necessary computer services. A single host 10 may belong to multiple service groups 100; however, for purposes of clarity, the present description will describe the interaction among hosts in a single service group.

To maintain coordination among the various members of the service group, a new IP address referred to as a service group address 105 is established for each service group, and is typically an IP multicast address and a port number. All hosts 10, or members, within a service group 100 communicate with one another using the service group address 105 that is each member transmits messages to all other group members by addressing the message to the service group address, and each member receives messages from all other service group members by receiving messages destined to the service group address. These messages, which may be thought of as control messages, are typically broadcast on a periodic basis by each host using a protocol such as UDP and communicate a variety of data. The data structure of the control/info message is shown in FIG. 2B. Typical message contents include: (1) the well-being of the host providing the message; (2) capacity and load; (3) a list of control addresses; (4) the preferred service address; (5) a list of addresses currently being served, including (a) the service address, and (b) the state of that service address, which can be either acquiring, releasing, on-line, or not served; and (6) a list of addresses that should be served including (a) the service address and (b) the last time that address was served by the preferred host.

The foregoing data about the transmitting host which is included in the control message is typically maintained in a data table referred to as a Host Information Entry, and is transmitted only if authoritatively correct. An exemplary Host Information Entry structure is shown in FIG. 2C. In addition, in an exemplary embodiment the control message further includes whatever information that host has received about the other hosts included in the service group, and when information was last received from that other host (i.e., aging.) This data is stored is a database, referred to as the Host Information Database. The data structure of Host Information Database is simply a series of Host Information Entries, organized by id_address. In addition, the Control Message includes a Service Address Database, which is arranged as a set of service addresses and the time since last update for each; See FIG. 2D for an exemplary structure. As will be appreciated hereinafter, the time is reset with every new entry; and such resets are used to ensure that the host responsible for that service address has not died. A failed, or dead, host stops sending messages, which alerts the present invention to reassign that host's tasks.

The transmission of the control messages is handled by the Service Monitor associated with each service, such as SM1. The Service Monitor is multi-threaded, for which the threads are created for: Transmit, Receive, Script, Control and DNS. The Transmit thread transmits the control message, while the Receive thread receives control messages from other hosts within the service group. The Script thread handles all events that may take too long for handling by the other threads, while the control thread determines which of the hosts within the service group will be "leader" and will make assignment decisions. Finally, the DNS thread simply updates the DNS. Each of these threads will be discussed in greater detail hereinafter.

Referring next to FIG. 3, the Transmit thread may be better understood. It will be appreciated that each host begins one Transmit thread for each service. The Transmit thread starts at step 300 in the "Sleep" state. The process advances at step 305 by invoking the test objects TO1 . . . TOn associated with that service, followed at step 310 by checking whether the test is passed. If the tests fail, or a NO results at step 310, the process advances to step 320 and invokes a script to schedule the release of all current service addresses (so that the service addresses can be reassigned to another, non-failed host), after which a control message is created and sent at step 330. The process then loops back to sleep at step 300.

However, if the tests at step 310 resulted in an OK, the process advances to step 350 where load and capacity information (discussed above) is gathered from each of the load objects LO1 . . . LOn. At step 360, the service address and timer data is then written if an "I'm alive" time-out timer requires it. A control or info message is then created and sent at step 370 to communicate the state of the host to the remaining members of the service group, and at step 380 ARP packets are sent. The process then loops back to sleep at step 300. Thereafter, the daemon will restart the process after an appropriate time.

Figure 4A:
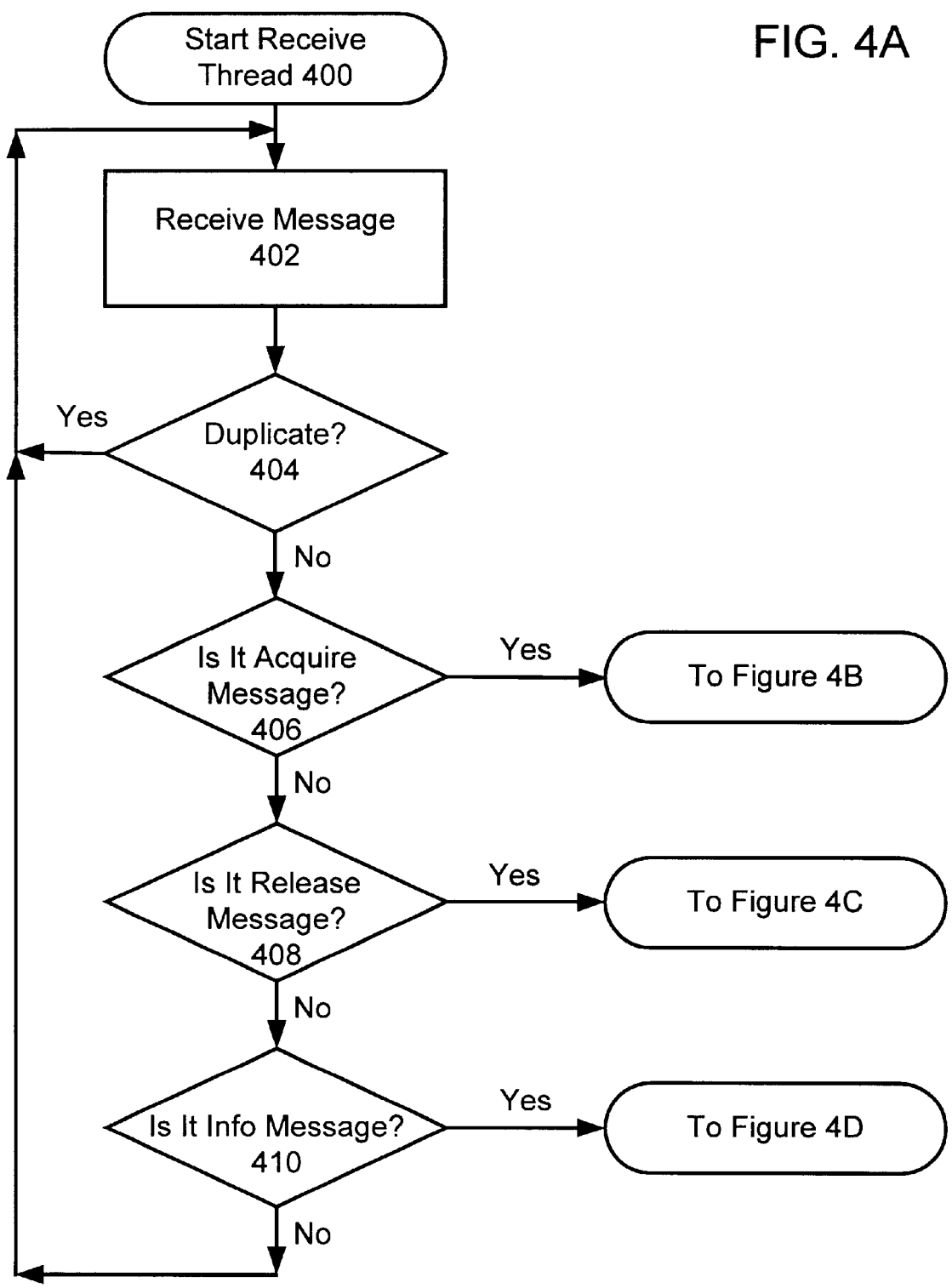
FIG. 4A shows in flow diagram form the "receive" thread of the service monitor.
Figure 4B:
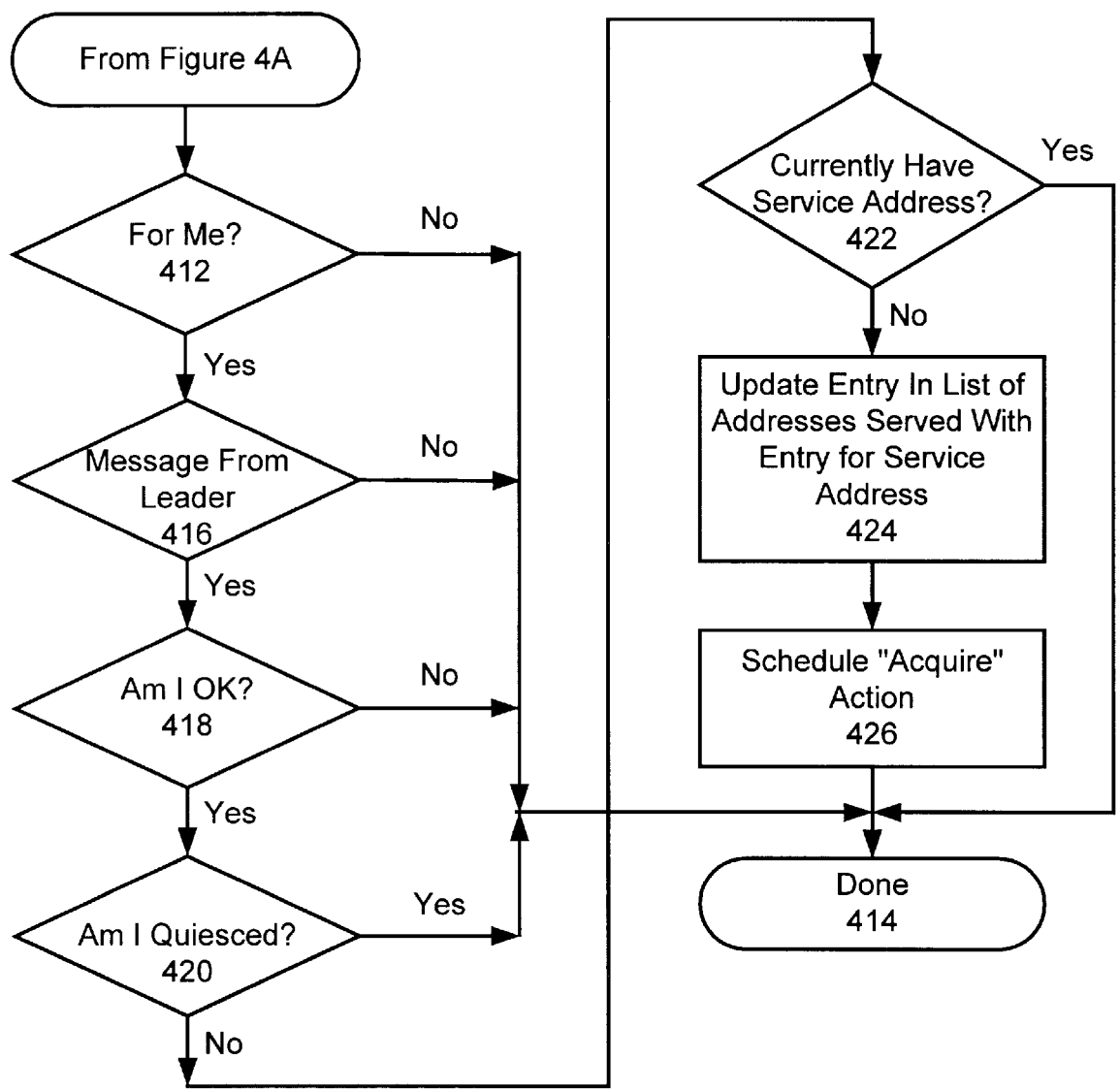
FIG. 4B shows in flow diagram form the "acquire message" portion of the receive thread.
Figure 4C:
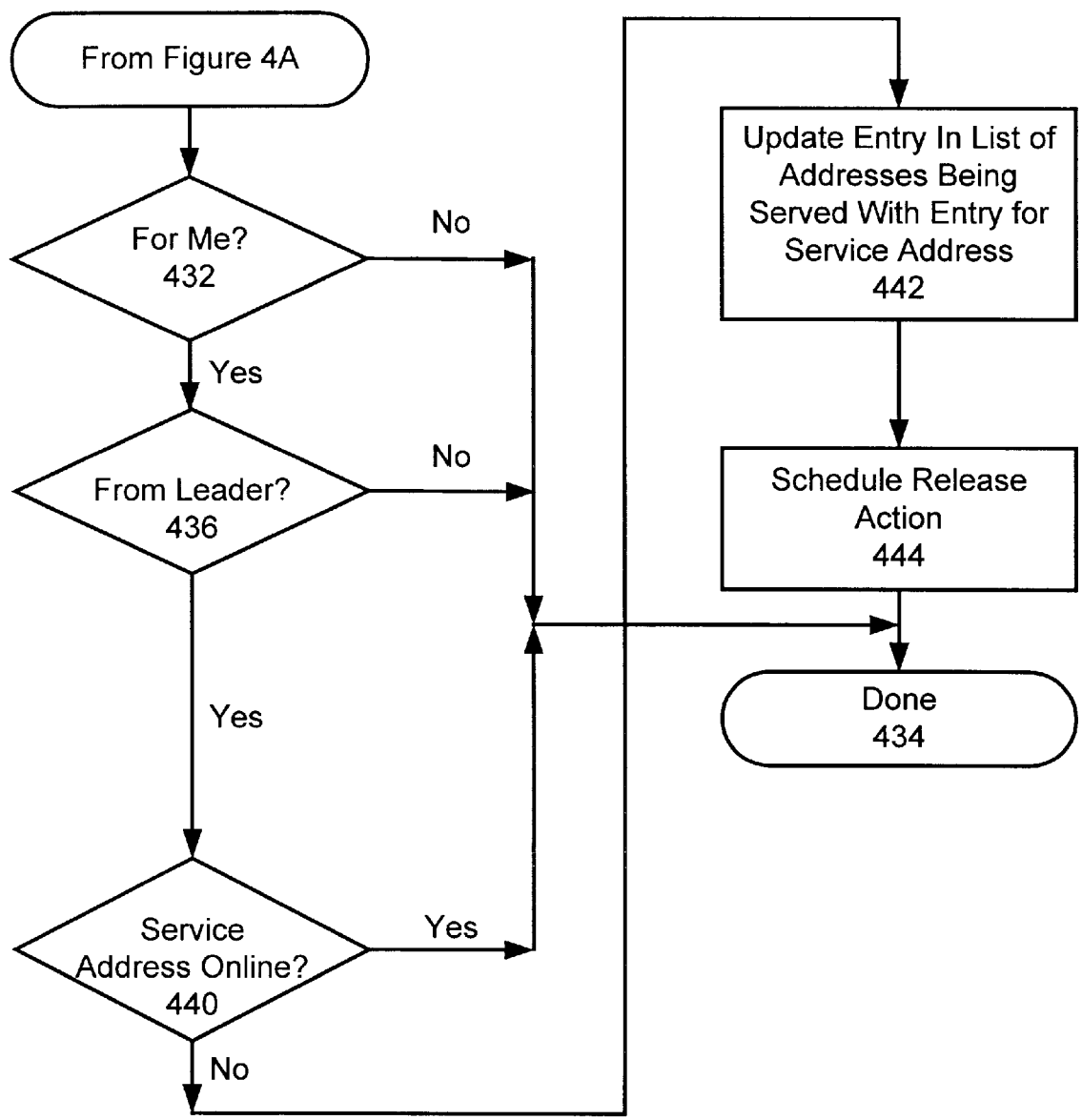
FIG. 4C shows in flow diagram form the "receive message" portion of the receive thread.
Figure 4D:
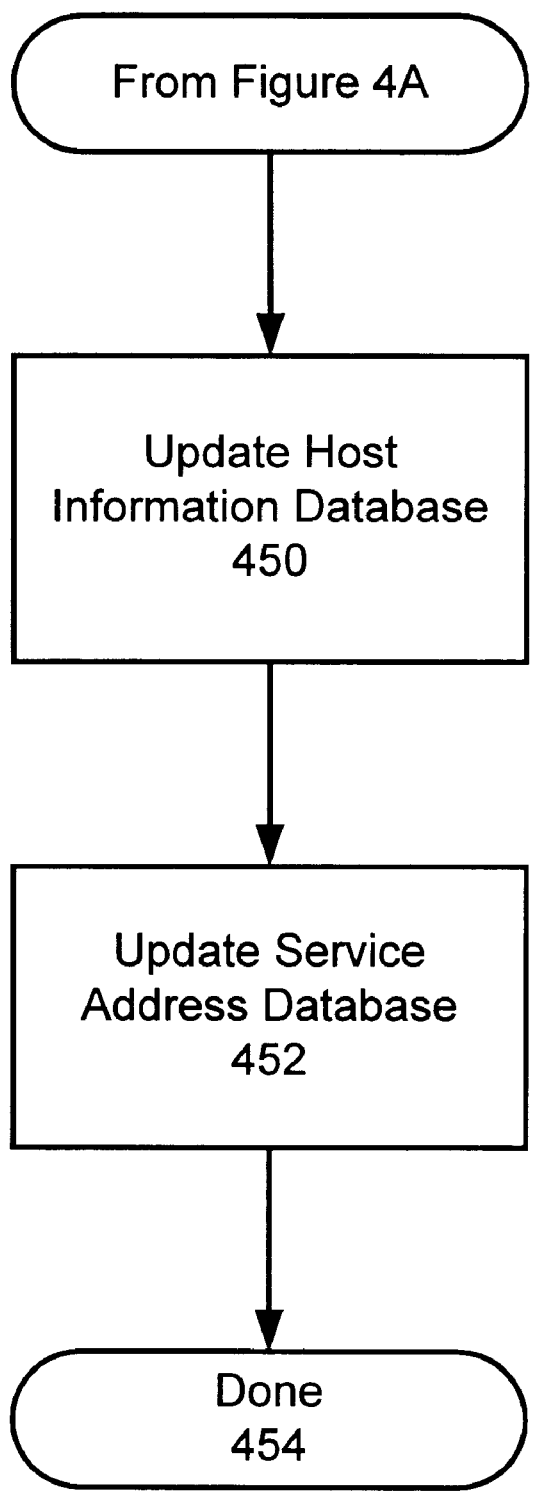
FIG. 4D shows in flow diagram form the "update tables" portion of the receive thread.

Reference is now made to FIGS. 4A–4D. The Receive thread is shown at a top level in FIG. 4A, with FIGS. 4B–4D showing the various branches that are included as part of the Receive thread. The Receive thread initiates at step 400, and advances to step 402 where a message is received from another host within the service group. A check is then made at step 404 to determine whether the message is a duplicate; if so, the process loops back to step 402 to receive another message. If the message is not a duplicate, the process advances to step 406 and checks to see whether the message is an acquire message. If so, the process branches to FIG. 4B, discussed below. If not, the process advances to step 408 and checks to see whether the message is a release message. If so, the process branches to FIG. 4C discussed below; if not, the process advances to step 410. At step 410 a check is made to determine whether the message is an info, or control, message. If so, the process branches to FIG. 4D, also discussed below. If not, the message is discarded and the process loops back to step 402

Referring next to FIG. 4B, the operation of the Receive thread in response to an "Acquire" message can be seen. The "acquire" process basically involves having the leader send a message identifying the source and destination id_addresses, together with which service address is to be acquired. Thus, the process starts at step 412 by checking whether the received "acquire" message is for that host. If not, the process is done and returns at step 414 by looping to step 402. If the message is for that host, the process advances to check whether the message is from that host's leader by comparing addresses in the Host Information Database. Again, if not, the process again returns at step 414.

If the check at step 416 yields a YES, the process advances at step 418 and determines whether the receiving host is OK. If not, the process again returns at step 414; but if so, the process advances to step 420 and a check is made to determine whether the host is quiesced (which can be ascertained from the Host Information Entry, although operator intervention is typically required to set the host as quiesced.) If the answer at step 420 is yes, no service address can be acquired, so the process again returns at step 414. However, if the host is not quiesced, a check is then made at step 422 to determine whether the host currently is servicing the service address identified in the acquire message. This can be determined by examining the host's Host Info Entry. If so, there is no need to reacquire the "new" service address, and the process returns at 414 If the host is not currently servicing the identified service address, the process advances at step 424 by updating the Host Information database with an entry for the new service address, and an "acquire" action is scheduled at step 426 The "acquire" action is described in greater detail in connection with FIG. 5B The process then returns at step 414.

Referring next to FIG. 4C, the Release portion of the Receive thread can be better appreciated. From the following, it will be apparent to those skilled in the art that the Release portion is substantially similar to the Acquire portion. The process starts at step 432 by checking whether the message is for the receiving host. If not, the process returns at step 434. If so, the process advances to step 436 and checks whether the message is from the leader of that service group by comparing Host ID's in the Host Information database; if not, the process again returns at step 434. If the message is from the leader, then a check is made at step 440 (by looking at the relevant flag in the Host Info Entry) to determine if the identified service address to be released is on-line. As with the "Acquire" message, the "Release" message comprises source and destination id_addresses. If the service address to be released is not being serviced by the receiving host, the process returns at step 434. However, if the service address is being serviced, as determined by the listing in the Host Info Entry, the service address is first marked as "releasing" in the Service Address Information, and the Host Information database is updated at step 442 by deleting that service address from the list of service addresses serviced by that host, and the process advances to step 444 to schedule a release action. A "release" action is described in connection with FIG. 5C. The process then returns at step 434.

Referring next to FIG. 4D, the response to an info, or control message can be understood. The response to an info message is simply to update the appropriate tables maintained by the receiving host, particularly the Host Information database referred to previously, which effectively updates the status of each service address. Thus, the process begins at step 450 by updating the Service Address database with the information received from the other host, and then advances to step 452 by updating a table, or list, of addresses that should be served by the service group. The list specifies, for each service address, the last time that address was served by the preferred host, and resets a time-out timer that basically serves to confirm that the responsible host is alive and well. Once these tables are updated, the process returns at step 454.

Figure 5A:
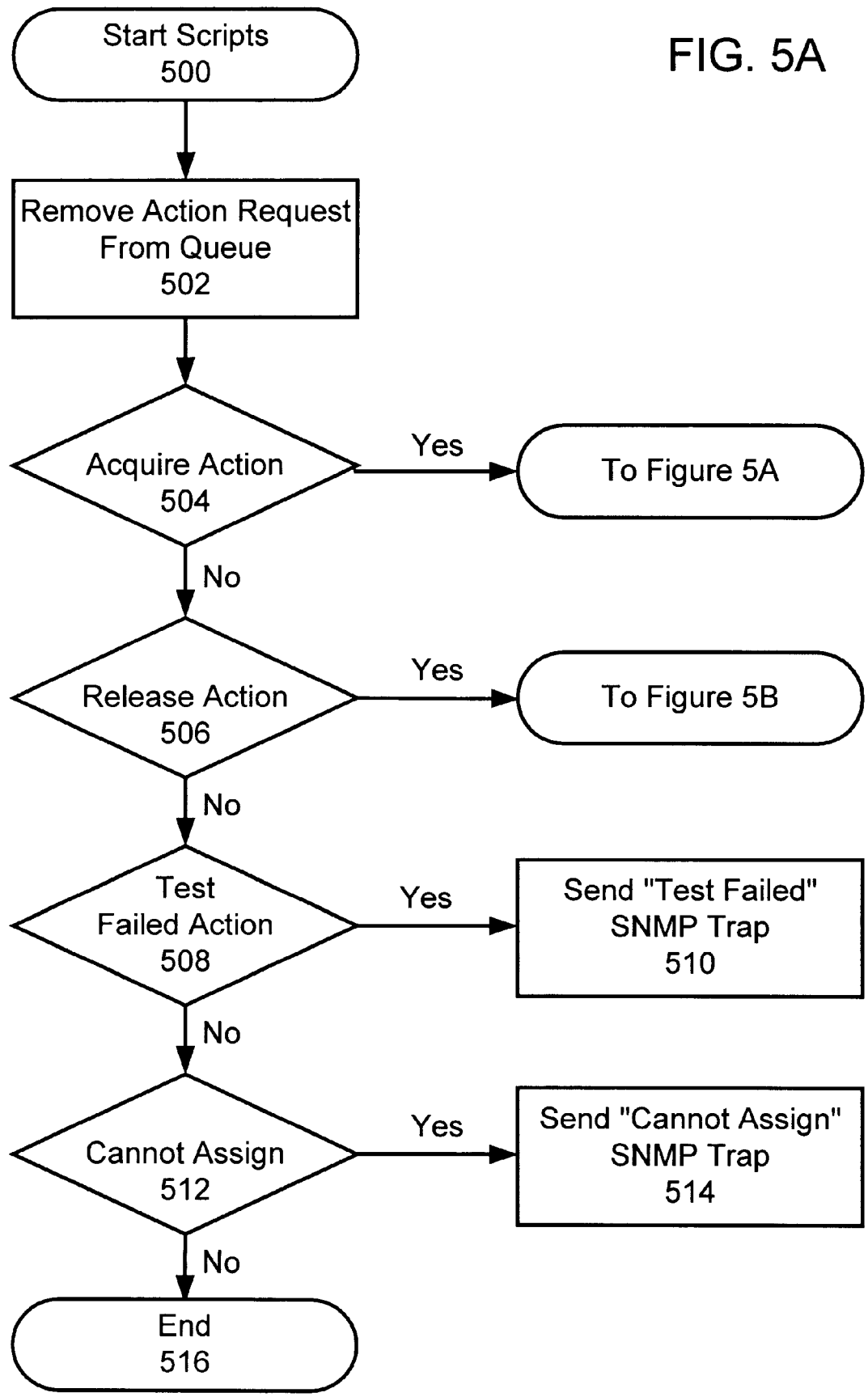
FIG. 5A shows in flow diagram form the "scripts" thread of the service monitor.
Figure 5B:
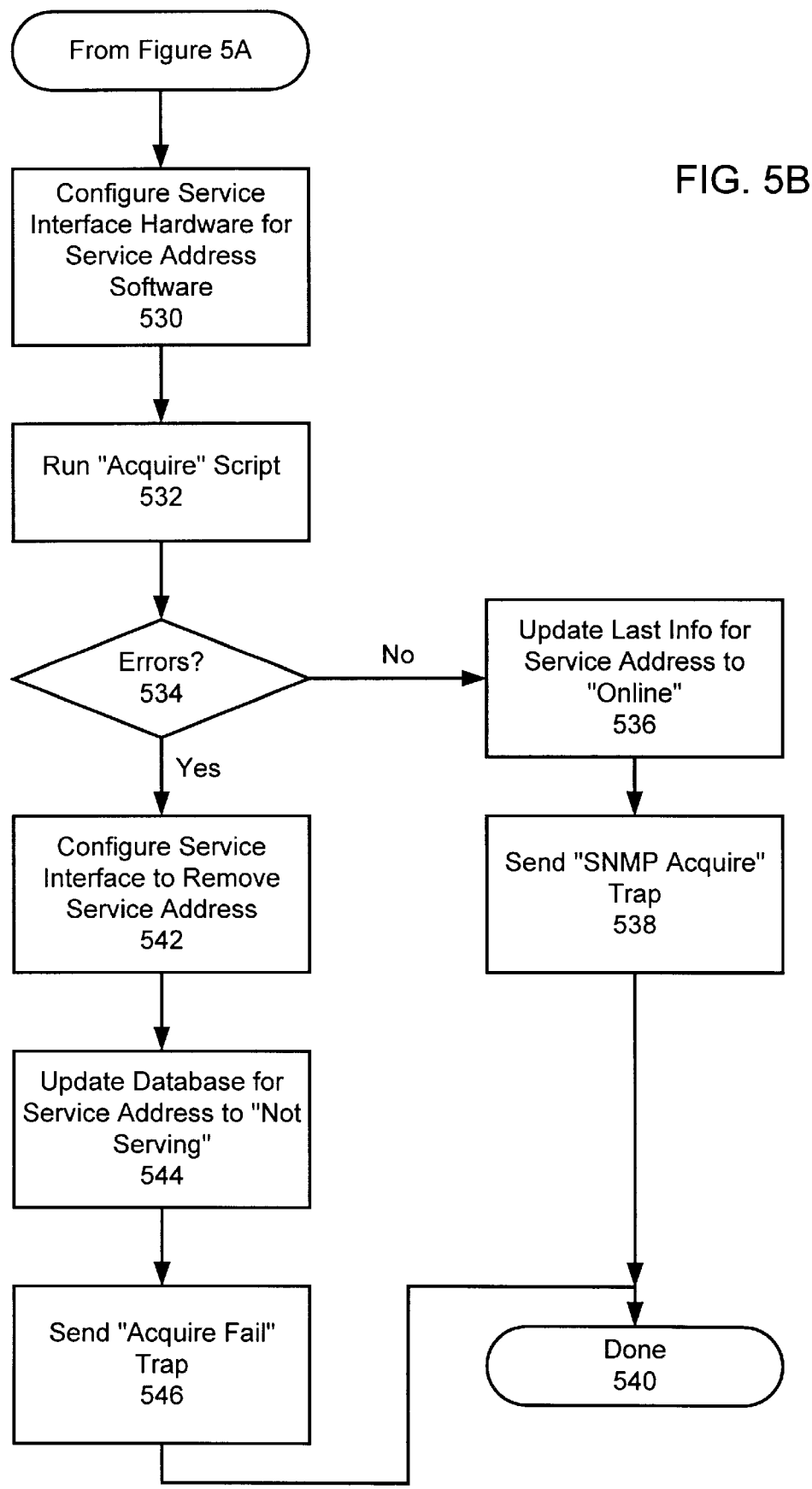
FIG. 5B shows in flow diagram form the "acquire action" portion of the scripts thread.
Figure 5C:
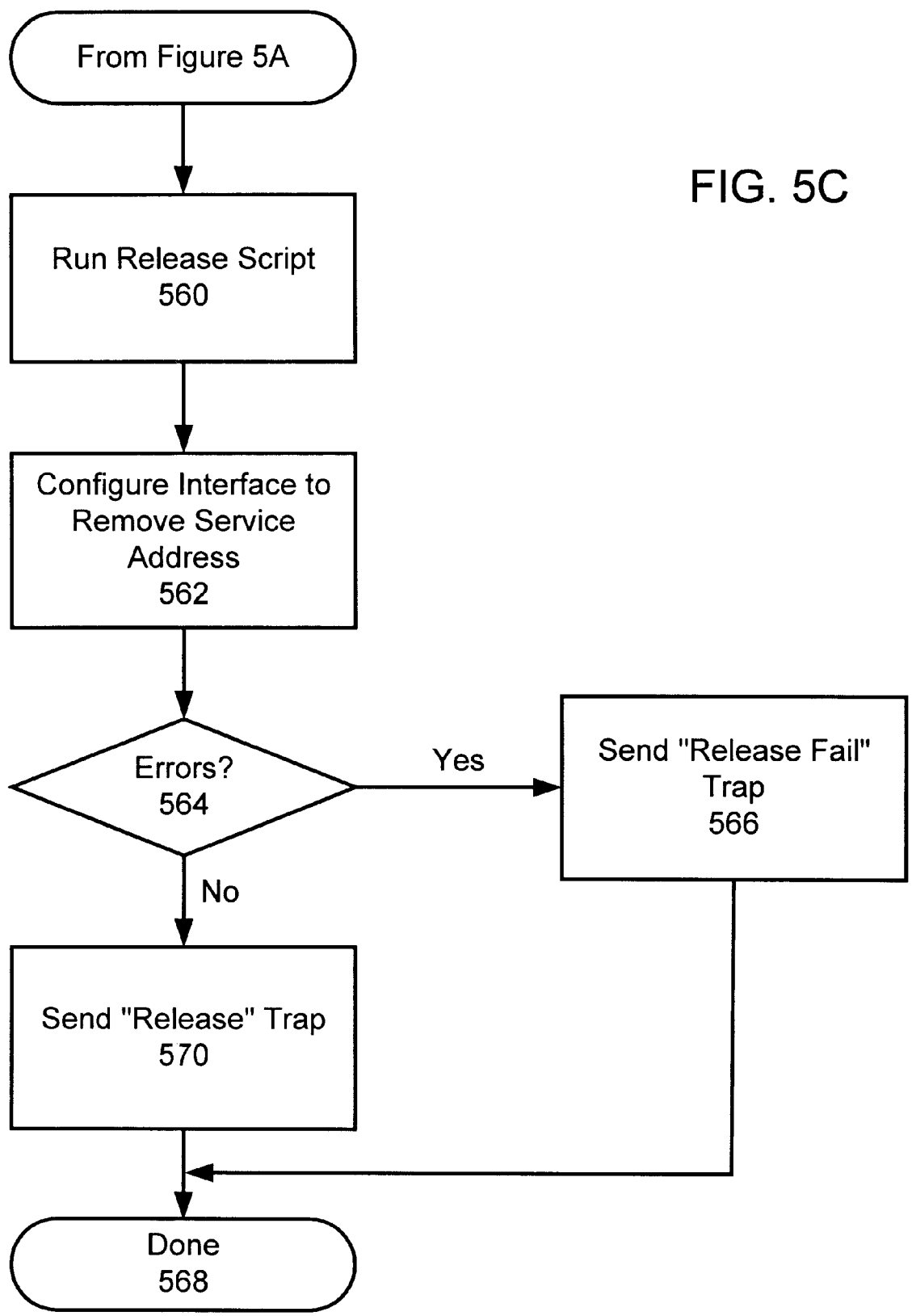
FIG. 5C shows in flow diagram form the "release action" portion of the scripts thread.

The next thread of the Service Monitor to be considered is Scripts, for which reference is made to FIGS. 5A–5C. FIG. 5A shows the overall thread, while FIGS. 5B and 5C show key branches of the thread. Scripts are generally more complicated processes, and because of this may be run after some delay rather than immediately. The process begins at 500 and advances to step 502 by removing the request for action from the queue. A check is then made at step 504 to determine whether the requested action is an "Acquire" action. If so, the process branches to FIG. 5B. If not, the process advances to step 506 to determine whether the requested action is a "Release" action. If so, the process branches to FIG. 5C; if not, the process advances to step 508, where a check is made to determine whether the action requested is a "test failed" action. If the check results in a YES, a "Test Failed" SNMP trap is sent at step 510. If the check results in a NO, the process advances to step 512 where a check is made to determine whether the requested action is a "Cannot Assign" action. If the check results in a YES, the process branches to step 514 and a "Cannot Assign" SNMP trap is sent. If the answer is a no, the process completes at step 516.

Turning next to FIG. 5B, the "Acquire" branch from FIG. 5A may be better understood. As noted previously, the "acquire" process assigns a service address to a host. The branch begins at step 530 by configuring the hardware service interface for the software service address, and then advances to step 532 where the Acquire script is run. Following execution of the Acquire script, the process advances to step 534 and a check for errors is made. If no error occurred, the process advances to step 536 and updates, for that service address, the Host Info Entry to "on-line" . The process then advances to step 538 and sends an SNMP Acquire trap, following which the process completes at step 540.

If an error occurred at step 534, such that a YES was returned, the process advances to step 542 by configuring the service interface hardware to remove the service address. The process then continues at step 544 by updating the Host Info Entry for that service address to "not serving" and then, at step 546, sends the "Acquire fail" SNMP trap. The process then completes.

Referring next to FIG. 5C, the Release script branch of the Scripts thread can be better appreciated. Similar to the Acquire branch shown in FIG. 5B, a release action causes a host to release one of the service addresses it has been handling. The branch begins at step 560, and runs the Release script. The service interface (hardware) is then configured at step 562 for the service address (software) to remove the service address being released. A check for errors is made at step 564, and if an error occurs a "Release Fail" trap is sent at step 566, after which the process completes at step 568. Whether or not an error occurs, a "Release" trap is sent at step 570, the Host Info Entry is also updated to remove the affected Service Address and the process completes.

Figure 6A:
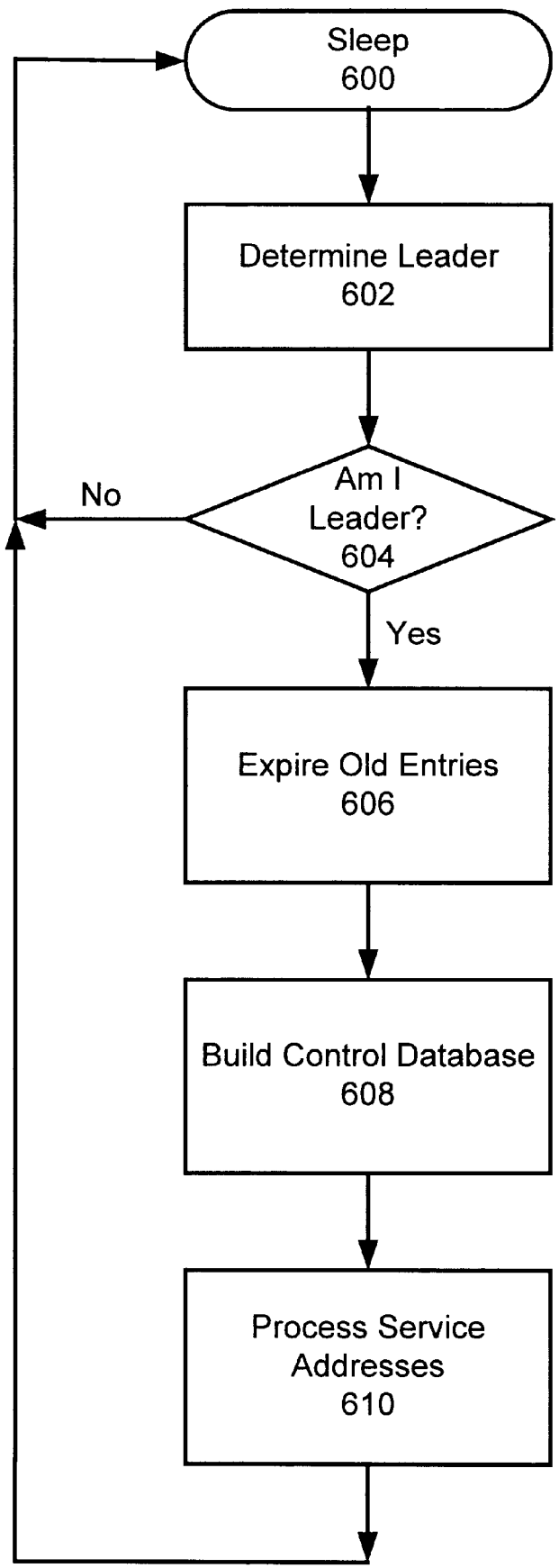
FIG. 6A shows in flow diagram form the "control" thread of the service monitor.

With reference to FIG. 6A, the Control thread of the service monitor can be better understood. The purpose of the Control thread is to establish which host within the service group will be the leader, and to permit the leader to manage service addresses dynamically in accordance with the state of the system. The process starts at step 600 in the Sleep mode. When awakened, the processes advances at step 602 to determine who the leader is currently. A check is made at step 604 to determine whether the current host is the leader. If not, the process loops back to step 600.

However, if the check at step 604 yields a yes, the process advances to step 606 and removes old, timed-out entries and silent host information by updating the database to the current state. A silent host is a host that has failed to send a control info message within the time-out period, such that the leader assumes the host to have died. This permits additional decisions, such as reassignment of the service addresses formerly served by a failed host to be made reliably by the leader. Once the outdated entries are removed, a control database is built at step 608, discussed in greater detail below. After the control database has been built, each of the service addresses is processed at step 610 to update its status to current information, also described in greater detail below. The process then loops back to the Sleep mode at step 600.

The control database basically comprises three tables. The first is the control service address table, shown in FIG. 6B, which sets forth four items: (1) the service address within the service group, (2) the states of each service address (i.e., acquiring, releasing, on-line, or unserved), (3) the preferred service address (or preferred id_address) of each host, and (4) a set of id_addresses which claim to service that service address. The second table is the control Spare_Host_List and the third is the Non_Spare_Eligible_List; these are simply a single-column list of IP addresses. For hot spares, the preferred service address is operator-configured to zero, or not assigned.

The table is built through a pair of nested loops, beginning with a examination of the Host Information database. A pseudo-code representation for the outer nested loop of an exemplary embodiment is:

```
if host is OK
    if preferred service address = 0
        if not quiesced
            Add Host to Spare_Host_List
        else
            if not quiesced
                Add Host to Non_Spare_Eligible_List
    endif
    if preferred service address is not expired,
        set preferred id_address of entry for
        preferred_service_address
    endif
```

The inner nested loop is, for each service address in the list of service addresses currently being served, as maintained in the Host Information Entry currently being processed:

```
if service_address not expired
    add id_address to id_address_list for service address
    add state of service address
else
    send release message to host to release expired service addresses
endif
```

As used in the foregoing, "id_address" means the Host ID. As will be appreciated by those skilled in the art, the foregoing iterates through the preferred service addresses and id_addresses, or items (3) and (4) of the control service address table, and then returns to iterate through the states of the various service addresses in the table.

A pseudo-code representation of the steps needed to develop the states of the various entries is as follows:

```
if state including acquiring or releasing,
    continue
endif
if number of id_addresses [item (4) in Control Service Address table] = 0
    then unserved
    continue
endif
```

```
if has preferred id_address and service address not served by preferred id
address and preferred id_address has not quiesced then add preferred
id_address to entry
endif
if number of id_addresses > 1,
    then duplicate exists
endif.
```

The foregoing process essentially injects an entry of a service-address artificially, and relies on a later check for duplicate hosts to remove one of the two hosts now serving that address. "Duplicate" as used in the pseudocode is a function and requires involvement of the system to resolve duplicates, as will be discussed in greater detail hereinafter.

```
if preferred_id_address != 0 and [where "!=" means "not ="]
    preferred host is not quiesced then
        choice = preferred_id address
    else if (spare_host count > 0) [from Spare_Host_List Table]
        choice = random pick from Spare_Host_List
    else if (Non_Spare_Eligible count > 0)
        choice = random pick from Non_Spare_Eligible List
    else schedule cannot assign action
        done/return
    endif
    send acquire message to choice
done
```

To ensure proper operation, a- check must be made by the leader for duplicate hosts serving the same service address, and one of the duplicates removed. As previously noted, in an exemplary embodiment all control decisions are made by the leader. A pseudocode representation for such a process is:

```
if preferred_id_address != 0 and preferred host not quiesced
    choice = preferred_id_address
else
    if service address served by one or more from Spare_Host_List
        choice = random pick from Spare_Host_List serving
        Service_Address
    else
        choice = random pick from id_addresses
endif
sendmsg to all others (except choice id_address to release
```

The foregoing process can be seen to assign the service address to the preferred service address if that address is available; otherwise, the leader assigns the service address to an available hot spare. If neither of these works, the leader can simply pick one. The leader then tells the remaining service addresses to release the address. An exception to this process exists for the artificially injected address discussed above; in this instance, the artificially inserted address is not told to release.

The final thread of the Service Monitor is the DNS thread. The DNS thread basically determines load versus capacity for load balancing, and is calculated from a comparison the utilization of the various service addresses both currently and historically. A first table or database AA, shown in FIG. 6C, stores the historical utilization and weighted utilization for each service address, while a second table or database BB stores current utilization and weighted utilization for the various service addresses. It will be appreciated that databases AA and BB have the same structure, with the data from database BB simply being transferred to database AA as a new sample is entered in database BB. The pseudocode representation of the DNS thread can then be represented as follows:

```
Initialize current DB [BB] to empty
For each entry in Host Info DB
    if entry expired [i.e., host timed out]
    or host quiesced
    or preferred_service_address = 0 then
        continue
    endif;
    util = (load * scaling factor) / capacity
    add new entry to BB
    if (util > high water mark) then
        weighted_util = util + (delta)
    else if (util > low water mark) then
        if service_address is in AA, then
            weighted_util = util
        else
            weighted_util = weighted_util + delta
        endif
    else
        weighted_util = util
    endif
endfor
if number of entries in BB > minimum number of service addresses then
sort BB by weighted_util for each entry in ascending order for each entry
in BB starting at the minimum number of service address (i.e. index
starts at minimum of service address and ends at number of entries in
BB)
        if (entry's weighted_util > hign water mark) then
            remove entry
        endif
    endfor
endif
if not same list addresses as AA then
    update DNS zone
endif
swap BB and AA [i.e., current becomes last and last will become next
    current.]
```

It will be appreciated that the foregoing scaling factor can be varied according to optimize performance according to a number of criteria. The scaling factor is typically in the range of 100 to 1000, so that the value of "util" is an integer. The scaling factor, once selected, will typically remain fixed although some paradigms exist in which variation of the scaling factor may be desirable. The value of Delta is the difference between the high water mark and the low water mark, and is preset.

It will also be appreciated that the sorting of the entries in the current database BB provides a pruning, for purposes of load balancing.

Having fully described a preferred embodiment of the invention and various alternatives, those skilled in the art will recognize, given the teachings herein, that numerous alternatives and equivalents exist which do not depart from the invention. It is therefore intended that the invention not be limited by the foregoing description, but only by the appended claims.

What is claimed is:

1. A computer program product, comprising:
    a computer usable medium having computer readable code embodied therein for causing reassignment of computer services from one host to any of a plurality of other hosts within a service group, the computer program product including:
        first computer readable program code devices configured to cause a computer to transmit a message through a service group address setting forth the state of the computer;
        second computer readable program code devices configured to cause a computer to receive at least one message through a service group address from at least one other computer; and
        third computer readable program code devices configured to respond to at least one message to acquire or release computer services.

2. The computer program product of claim 1 wherein the messages to acquire or release computer services are the result of the failure of another host within the service group.

3. The computer program product of claim 1 wherein the messages to acquire or release computer services are the result of load balancing within the service group.

4. A method for dynamically reassigning computing services to various hosts in a network including the steps of:
    establishing a service group for each computing service including a unique Internet Protocol address assigned to each of a plurality of host computers so that the computing service is available as long as one of the plurality of hosts is available within the service group;
    assigning responsibility for a computing service to a first host computer within the service group;
    transmitting periodically among the host computers of the service group messages through a service group address representative of the state of at least the first host computer;
    receiving through a service group address from the remaining host computers within the service group messages representative of the state of such remaining host computers;
    evaluating the presence or absence of such messages and their contents; and
    reassigning to another host, within the plurality of computers, responsibility for the computing service in response to such evaluation.

5. The method of claim 4 wherein the reassigning step is the result of a lack of a message from one of the hosts.

6. The method of claim 4 wherein the reassigning step is the result of load balancing within the service group.

7. Apparatus for providing dynamic reallocation of computing services within a network including a plurality of hosts comprising:
    a service group including a plurality of at least three hosts each available to provide a desired computing service including a unique Internet Protocol address assigned to each of the plurality of at least three hosts so that the computing service is available as long as one of the plurality of hosts is available within the service group;
    a message portion configured to provide data through a service group address, where the data concerns the state of each of the plurality of hosts; and
    a leader portion configured to assign responsibility through a service group address for each of the computing services to any host within the service group in response to the message portion.

8. The method of claim 4, further including the step performed by the first host computer of:
    assigning responsibility for particular computing services to each of the remaining plurality of host computers.

9. The method of claim 4, further including the steps of:
    comparing utilization with a preset maximum utilization setting; and
    performing load shedding where utilization of one of the hosts exceeds the preset maximum utilization setting by shifting new connections to other less loaded hosts.

10. The method of claim 4, further including the steps of:
    comparing utilization with a preset minimum utilization setting; and performing load gaining where utilization of one of the hosts drops below the preset minimum utilization by adding the host to a Domain Name Service Zone.

11. The method of claim 4, further including the step of: using modification of a Domain Name Service Zone to provide load balancing by establishing a configuration parameter that specifies a minimum number of available service addresses that must be present in the Domain Name Service Zone.

12. The method of claim 4, further including the step of: maintaining the hosts as hot spares.

13. The method of claim 4, further including the step of: maintaining one of the hosts in a quiesced state.

14. The method of claim 4, further including the step of: performing failure detection for a total host failure.

15. The method of claim 4, further including the step of: performing failure detection for a service failure.

16. The method of claim 4, wherein the plurality of hosts are a redundant array of independent servers.

* * * * *